United States Patent
Wang et al.

(10) Patent No.: US 10,195,671 B2
(45) Date of Patent: Feb. 5, 2019

(54) SYSTEM FOR PREPARING NANOPARTICLES BY SUPERCRITICAL HYDROTHERMAL SYNTHESIS

(71) Applicants: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

(72) Inventors: Shuzhong Wang, Shaanxi (CN); Lu Zhou, Shaanxi (CN); Yanmeng Gong, Shaanxi (CN); Lili Qian, Shaanxi (CN); Mengmeng Ren, Shaanxi (CN); Yanhui Li, Shaanxi (CN)

(73) Assignees: XI'AN JIAOTONG UNIVERSITY, Xi'an, Shaanxi (CN); XI'AN WONFU ENERGY AND ENVIRONMENT TECHNOLOGIES CO., LTD., Xi'an, Shaanxi (CN)

( * ) Notice: Subject to any disclaimer, the term of this patent is extended or adjusted under 35 U.S.C. 154(b) by 219 days.

(21) Appl. No.: 15/301,388

(22) PCT Filed: Nov. 10, 2014

(86) PCT No.: PCT/CN2014/090722
§ 371 (c)(1),
(2) Date: Oct. 2, 2016

(87) PCT Pub. No.: WO2015/149518
PCT Pub. Date: Oct. 8, 2015

(65) Prior Publication Data
US 2017/0021427 A1 Jan. 26, 2017

(30) Foreign Application Priority Data
Apr. 2, 2014 (CN) .......................... 2014 1 0131209

(51) Int. Cl.
*B22F 9/24* (2006.01)
*B22F 1/00* (2006.01)
(Continued)

(52) U.S. Cl.
CPC ................ *B22F 9/24* (2013.01); *B01D 17/02* (2013.01); *B01D 17/0217* (2013.01);
(Continued)

(58) Field of Classification Search
CPC .................................. B22F 1/0018; B22F 9/24
See application file for complete search history.

(56) References Cited

U.S. PATENT DOCUMENTS

2010/0178227 A1* 7/2010 Kim ....................... B82Y 30/00
423/263
2016/0039673 A1* 2/2016 Powers .................. B01J 19/004
252/519.4
(Continued)

*Primary Examiner* — Scott R Kastler

(57) ABSTRACT

A system for preparing nanoparticles by supercritical hydrothermal synthesis is provided. Firstly, a mixture of a first reactant and a second reactant and high-temperature water at an outlet of a heating furnace (10) are mixed and are heated to a reaction temperature, the mixture is connected to a supercritical hydrothermal synthesis reactor (14), and a product at an outlet of the supercritical hydrothermal synthesis reactor enters a heat regenerator (9); hot water at an outlet of a low-temperature section of the heating furnace (10) first enters the heat regenerator, and then enters a high-temperature section of the heating furnace so as to be continuously heated to a set temperature; fluid at the pipe side outlet of the heat regenerator separately passes through a heat exchange coil in a first reactant modulation pool (1) and a steam generator (2) in a waste heat power generation system (20).

20 Claims, 2 Drawing Sheets

(51) Int. Cl.
*B01D 17/02* (2006.01)
*B01D 19/00* (2006.01)
*B01D 36/00* (2006.01)
*B01J 3/00* (2006.01)
*B01J 3/04* (2006.01)
*F27D 99/00* (2010.01)
*B01D 21/26* (2006.01)

(52) U.S. Cl.
CPC ....... *B01D 19/0068* (2013.01); *B01D 36/008* (2013.01); *B01J 3/008* (2013.01); *B01J 3/04* (2013.01); *B22F 1/0018* (2013.01); *F27D 99/0001* (2013.01); *B01D 21/26* (2013.01); *B01D 21/262* (2013.01); *B22F 2201/05* (2013.01); *B22F 2202/03* (2013.01); *B22F 2998/10* (2013.01); *F27D 2099/0058* (2013.01)

(56) References Cited

U.S. PATENT DOCUMENTS

2017/0021427 A1* 1/2017 Wang ................... B22F 1/0018
2017/0349757 A1* 12/2017 Theodet ................ C09C 1/3669

* cited by examiner

US 10,195,671 B2

SYSTEM FOR PREPARING NANOPARTICLES BY SUPERCRITICAL HYDROTHERMAL SYNTHESIS

CROSS REFERENCE OF RELATED APPLICATION

This is a U.S. National Stage under 35 U.S.C 371 of the International Application PCT/CN2014/090722, filed Nov. 10, 2014, which claims priority under 35 U.S.C. 119(a-d) to CN 201410131209.1, filed Apr. 2, 2014.

BACKGROUND OF THE PRESENT INVENTION

Field of Invention

The present invention relates to a technical field of supercritical water, and more particularly to a system for preparing nanoparticles by supercritical hydrothermal synthesis.

Description of Related Arts

Nano-particles have special structural properties, such as large specific surface area, small size effect, interfacial effect, quantum effect and quantum tunneling effect, so that the nano-particles have different unique properties from traditional materials, and the specific electrical, thermal, magnetic, optical and mechanical properties are the most noticeable and have important application value. Traditional methods for preparing the nano-particles include the electrolysis method, the spray pyrolysis method, the gas phase reaction method, the liquid phase reaction method, the micro emulsion method, and the mechanical crushing method. In industrial production, the more mature electrolysis process and the mechanical grinding process have high production electricity consumption, low production efficiency and long production period. In recent years, the chemical liquid phase method has been the more active method for preparing nanoparticles. However, it generally needs a large number of organic solvents or highly toxic additive components, which results in serious pollution in the production, thereby greatly limiting the application. Therefore, it is important to find a green and highly effective method for preparing nanoparticles which takes water as the reaction medium.

Supercritical water (abbreviated as SCW) is the water under special conditions whose temperature and pressure are higher than the critical point (T=374.15° C. and P=22.12 MPa). The SCW has the nature of both liquid and gaseous water. In this state, only a small amount of hydrogen bonds exist in the water, the dielectric constant of the SCW close to that of the organic solvent, and the SCW has a high diffusion coefficient and a low viscosity. Supercritical hydrothermal synthesis reaction is that in a closed high-pressure reactor, the SCW is taken as the reaction medium for allowing the metal salt to hydrolyze and dehydrate in the hydrothermal medium, so as to further nucleate and grow, for finally forming the nano-grains with a certain particle size and crystal morphology. In the SCW, the non-polar gases such as reductive organic matters or $H_2$ are able to be mixed with the SCW to form a homogeneous reaction system, so that metal oxides are able be efficiently reduced to produce high-purity metal nanoparticles. The reaction medium is the SCW, the reaction process in the closed high-pressure vessel, so that no other pollutants are introduced in the reaction process. Therefore, the supercritical hydrothermal synthesis reaction is considered to be a green environmental nano-preparation technology.

Currently, no complete process scheme for preparing nano metal materials by supercritical hydrothermal synthesis exists, which relates to some critical technical problems as follows.

(1) Achieve rapid heating of metal salt solution. Continuous supercritical hydrothermal synthesis of nanoparticles in the process, usually adopts directly mixing the metal salt solution at normal temperature and the SCW in the mixer, and quickly heating to the supercritical state. The process has the advantages of rapid heating rate, rapid generation of a large number of crystal nucleuses, short residence time, and effective inhibition of grain growth and agglomeration. In the design of the reactor, the mixing manner of two fluids is the key to determine whether the system is able to run well. In the field of engineering, the method that static mixers are adopted to mix the high-temperature and high-pressure fluid has been extensively studied, but how to control the solid particle generation reaction by controlling the mixing within a very short time period of mixing is a technical problem. Good evaluation criteria of the mixers should be able to achieve rapid and symmetrical mixing of two fluids so as to achieve fast and uniform nucleation, thereby controlling the quality of the product.

(2) Adopt organic ligands to prevent agglomeration of nanoparticles. Due to the characteristics such as a large surface area and a large surface energy, the surface of the nanoparticles is in the absence of adjacent coordination atoms, and is in the energy instability, which is prone to agglomeration. Therefore, it is necessary to add organic ligands during the hydrothermal synthesis of nanoparticles. Organic ligands are able to enhance the steric hindrance effect among the particles and inhibit particle growth and agglomeration. In general, the organic ligands used in the supercritical hydrothermal synthesis reaction are added excessively, so it is needed to recycle and reuse the residual organic ligands after reaction, for achieving organic waste emission.

SUMMARY OF THE PRESENT INVENTION

An object of the present invention is to provide a system for preparing nanoparticles by supercritical hydrothermal synthesis, so as to resolve the critical technical problems on the supercritical hydrothermal synthesis of above-mentioned nano metallic materials.

Accordingly, in order to accomplish the above object, the present invention adopts technical solutions as follows.

A system for preparing nanoparticles by supercritical hydrothermal synthesis, comprising a first reactant modulation pool, a steam generator, a back pressure valve, a gas-liquid separator, a centrifugal separator, an oil-water separator, a heat regenerator, a heating furnace, a first material pump, a premixer, a mixer, a supercritical hydrothermal synthesis reactor, a second material pump, a pure water pump, a pure water storage tank, a second reactant storage pool, and a waste heat power generation system, wherein:

an outlet of the first reactant modulation pool is communicated with an inlet of the first material pump, an outlet of the first material pump is communicated with a first inlet of the premixer;

an outlet of the second reactant storage pool is communicated with an inlet of the second material pump, an outlet of the second material pump is communicated with a second inlet of the premixer, and an outlet of the premixer is communicated with a vertical inlet of the mixer;

an outlet of the pure water storage tank is communicated with an inlet of the pure water pump, an outlet of the pure water pump is communicated with a low-temperature section inlet of the heating furnace, a low-temperature section outlet of the heating furnace is communicated with a casing side inlet of the heat regenerator, a casing side outlet of the heat regenerator is communicated with a high-temperature section inlet of the heating furnace, a high-temperature section outlet of the heating furnace is communicated with a high-temperature water inlet of the mixer, a vertical outlet of the mixer is communicated with an inlet of the supercritical hydrothermal synthesis reactor, an outlet of the supercritical hydrothermal synthesis reactor is communicated with a pipe side inlet of the heat regenerator, a pipe side outlet of the heat regenerator is divided into two portions, one portion is communicated with an inlet of a heat exchange coil in the first reactant modulation pool, the other portion is merged with an outlet of the heat exchange coil and then communicated with an inlet of the steam generator in the waste heat power generation system, an outlet of the steam generator is communicated with an inlet of the back pressure valve, an outlet of the back pressure valve is communicated with an inlet of the centrifugal separator, an outlet of the centrifugal separator is communicated with an oil-phase inlet of the oil-water separator, an oil-phase outlet of the oil-water separator is communicated with an inlet of the second reactant storage pool.

A further improvement of the present invention is that the system for preparing nanoparticles by supercritical hydrothermal synthesis further comprises a desalination device which is located at a pipeline where the outlet of the supercritical hydrothermal synthesis reactor is communicated with the pipe side inlet of the heat regenerator, the outlet of the supercritical hydrothermal synthesis reactor is communicated with an inlet of the desalination device, and an outlet of the desalination device is communicated with the pipe side inlet of the heat regenerator.

A further improvement of the present invention is that the system for preparing nanoparticles by supercritical hydrothermal synthesis further comprises a desalination device which is located at a pipeline where the outlet of the centrifugal separator is communicated with the oil-phase inlet of the oil-water separator, the outlet of the centrifugal separator is communicated with an inlet of the desalination device, and an outlet of the desalination device is communicated with the oil-phase inlet of the oil-water separator.

A further improvement of the present invention is that the system for preparing nanoparticles by supercritical hydrothermal synthesis further comprises a pipeline filter which is located at a pipeline where the outlet of the steam generator is communicated with the inlet of the back pressure valve, the outlet of the steam generator is communicated with an inlet of the pipeline filter, and an outlet of the pipeline filter is communicated with the inlet of the back pressure valve.

A further improvement of the present invention is that the system for preparing nanoparticles by supercritical hydrothermal synthesis further comprises a fine filtration unit which is located at a pipeline where a water-phase outlet of the oil-water separator is communicated with the oil-phase inlet of the oil-water separator, the water-phase outlet of the oil-water separator is communicated with an inlet of the fine filtration unit, and an outlet of the fine filtration unit is communicated with the oil-phase inlet of the oil-water separator.

A further improvement of the present invention is that a regulating valve is located at a pipeline of the pipe side outlet of the heat regenerator.

A further improvement of the present invention is that the high-temperature water inlet of the mixer comprises three side entrances which are evenly distributed at a periphery of a vertical entry section of the mixer.

A further improvement of the present invention is that the system for preparing nanoparticles by supercritical hydrothermal synthesis further comprises a first reactant pretreatment system, wherein: an outlet of the first reactant pretreatment system is communicated with the inlet of the first reactant modulation pool.

A further improvement of the present invention is that the first reactant is a metal salt solution, and the second reactant is selected from a group consisting of alkali liquor, reducing agent and organic ligand.

Compared with the prior art, the present invention has some advantages as follows.

(1) The system for preparing nanoparticles by supercritical hydrothermal synthesis of present invention is able to achieve highly-effective recycling and reusing the residual organic ligands after reacting.

(2) The present invention adopts the method that the metal salt solution at normal temperature directly mixes with the heated water in the mixer to achieve rapid heating. Three side inlets of the mixer are evenly distributed at a periphery of the vertical inlet section of the mixer, so that the heated water is able to enter the mixer from the three side inlets for avoiding a contact between the reactant with the wall surface of the mixer, thereby achieving even rapid heating of the reactant.

Figure 1:
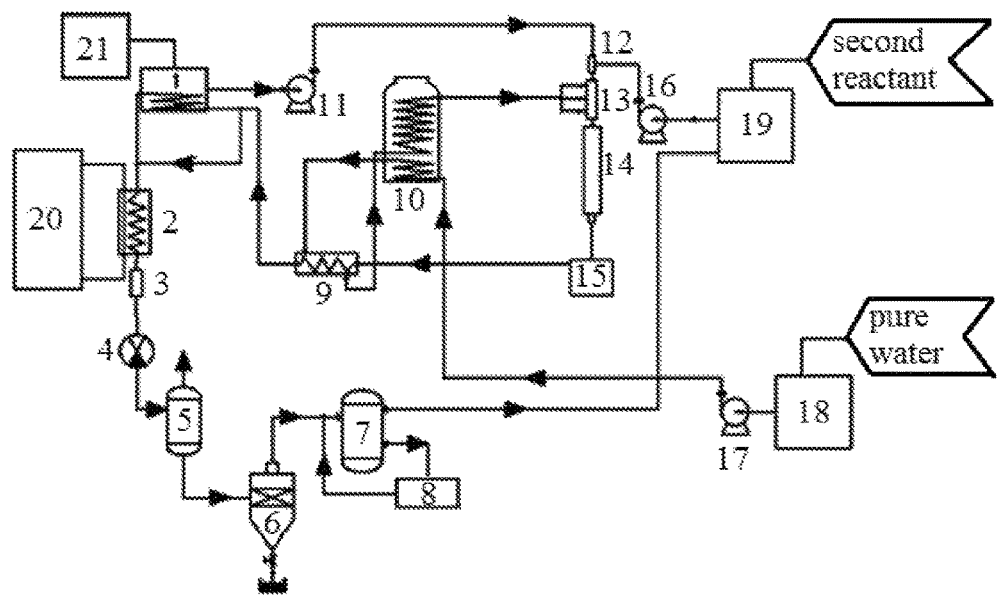
FIG. 1 is a flow diagram of a system for preparing nanoparticles by supercritical hydrothermal synthesis according to a first preferred embodiment of the present invention.

In the drawings, 1: first reactant modulation pool; 2: steam generator; 3: pipeline filter; 4: back pressure valve; 5: gas-liquid separator; 6: centrifugal separator; 7: oil-water separator; 8: fine filtration unit; 9: heat regenerator; 10: heating furnace; 11: first material pump; 12: premixer; 13: mixer; 14: supercritical hydrothermal synthesis reactor; 15: desalination device; 16: second material pump; 17: pure water pump; 18: pure water storage tank; 19: second reactant storage pool; 20: waste heat power generation system; 21: first reactant pretreatment system.

DETAILED DESCRIPTION OF THE PREFERRED EMBODIMENT

The present invention is further explained with accompanying drawings and embodiments in detail.

Figure 2:
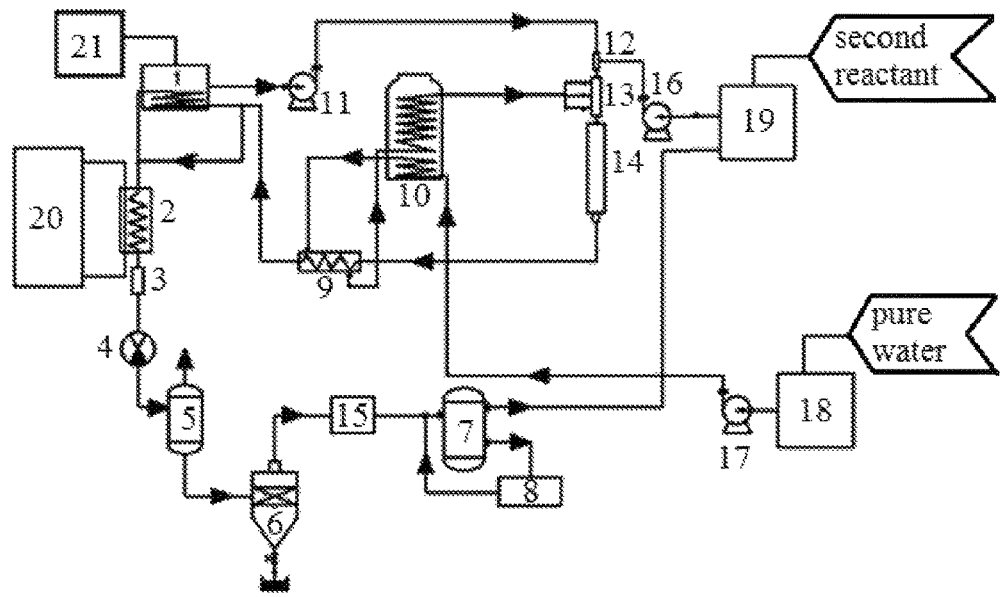
FIG. 2 is a flow diagram of a system for preparing nanoparticles by supercritical hydrothermal synthesis according to a second preferred embodiment of the present invention.

Referring to FIGS. 1 and 2 of the drawings, a system for preparing nanoparticles by supercritical hydrothermal synthesis according to a preferred embodiment of the present invention is illustrated, comprising a first reactant modulation pool 1, a steam generator 2, a pipeline filter 3, a back pressure valve 4, a gas-liquid separator 5, a centrifugal separator 6, an oil-water separator 7, a fine filtration unit 8, a heat regenerator 9, a heating furnace 10, a first material pump 11, a premixer 12, a mixer 13, a supercritical hydrothermal synthesis reactor 14, a second material pump 16, a pure water pump 17, a pure water storage tank 18, a second reactant storage pool 19, a waste heat power generation system 20 and a first reactant pretreatment system 21.

An outlet of the first reactant pretreatment system 21 is communicated with an inlet of the first reactant modulation pool 1, an outlet of the first reactant modulation pool 1 is communicated with an inlet of the first material pump 11, and an outlet of the first material pump 11 is communicated with a first inlet of the premixer 12.

An outlet of the second reactant storage pool 19 is communicated with an inlet of the second material pump 16, an outlet of the second material pump 16 is communicated with a second inlet of the premixer 12, and an outlet of the premixer 12 is communicated with a vertical inlet of the mixer 13.

An outlet of the pure water storage tank 18 is communicated with an inlet of the pure water pump 17, an outlet of the pure water pump 17 is communicated with a low-temperature section inlet of the heating furnace 10, a low-temperature section outlet of the heating furnace 10 is communicated with a casing side inlet of the heat regenerator 9, a casing side outlet of the heat regenerator 9 is communicated with a high-temperature section inlet of the heating furnace 10, a high-temperature section outlet of the heating furnace 10 is communicated with a high-temperature water inlet of the mixer 13, a vertical outlet of the mixer 13 is communicated with an inlet of the supercritical hydrothermal synthesis reactor 14, an outlet of the supercritical hydrothermal synthesis reactor 14 is communicated with a pipe side inlet of the heat regenerator 9, a pipe side outlet of the heat regenerator 9 is divided into two portions, one portion is communicated with an inlet of a heat exchange coil in the first reactant modulation pool 1, the other portion is merged with an outlet of the heat exchange coil and then communicated with an inlet of the steam generator 2 in the waste heat power generation system 20, an outlet of the steam generator 2 is communicated with an inlet of the pipeline filter 3, an outlet of the pipeline filter 3 is communicated with an inlet of the back pressure valve 4, an outlet of the back pressure valve 4 is communicated with an inlet of the centrifugal separator 6, an outlet of the centrifugal separator 6 is communicated with an oil-phase inlet of the oil-water separator 7, an oil-phase outlet of the oil-water separator 7 is communicated with an inlet of the second reactant storage pool 19, a water-phase outlet of the oil-water separator 7 is communicated with an inlet of the fine filtration unit 8, and an outlet of the fine filtration unit 8 is communicated with the oil-phase inlet of the oil-water separator 7.

In the first preferred embodiment of the present invention, the system for preparing nanoparticles by supercritical hydrothermal synthesis further comprises a desalination device 15 which is located at a pipeline where the outlet of the supercritical hydrothermal synthesis reactor 14 is communicated with the pipe side inlet of the heat regenerator 9, the outlet of the supercritical hydrothermal synthesis reactor 14 is communicated with an inlet of the desalination device 15, and an outlet of the desalination device 15 is communicated with the pipe side inlet of the heat regenerator 9.

In the second preferred embodiment of the present invention, the system for preparing nanoparticles by supercritical hydrothermal synthesis further comprises a desalination device 15 which is located at a pipeline where the outlet of the centrifugal separator 6 is communicated with the oil-phase inlet of the oil-water separator 7, the outlet of the centrifugal separator 6 is communicated with an inlet of the desalination device 15, and an outlet of the desalination device 15 is communicated with the oil-phase inlet of the oil-water separator 7.

Furthermore, a regulating valve is located at a pipeline of the pipe side outlet of the heat regenerator 9 for regulating a rate of flow of two portions of the pipe side outlet of the heat regenerator 9.

Figure 3:
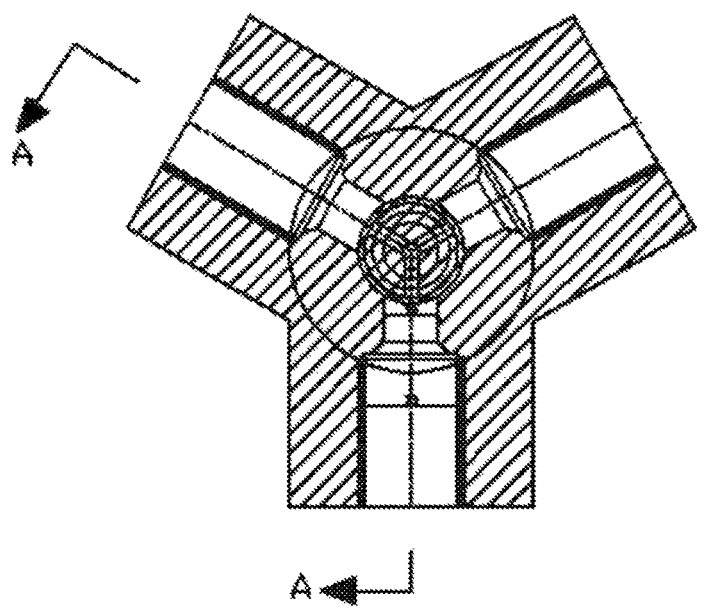
FIG. 3 is a structurally schematic view of a mixer of the present invention.
Figure 4:
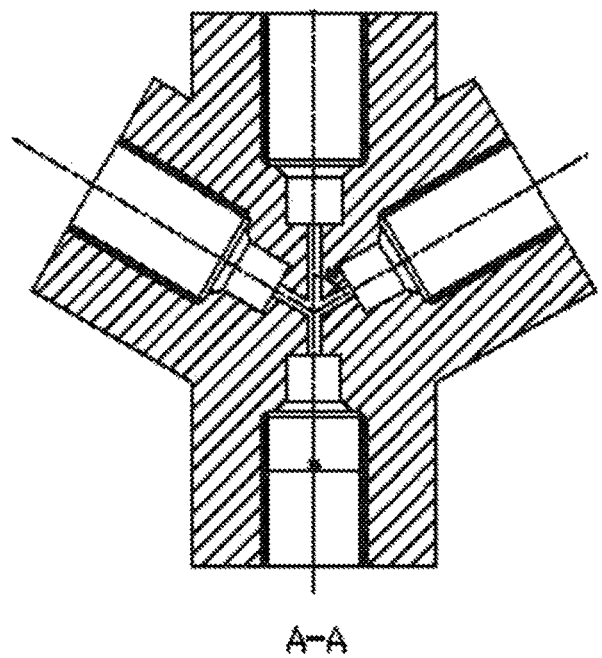
FIG. 4 shows a view along an A-A direction of FIG. 3.

Referring to FIGS. 3 and 4, the high-temperature water inlet of the mixer 13 comprises three side entrances which are evenly distributed at a periphery of a vertical entry section of the mixer 13, which is beneficial to allow the heating water to enter the mixer 13 from the three side entrances, so as to avoid a contact between the reactant and a wall surface of the mixer 13, thereby achieving an evenly rapid heating of the reactant.

To further understand the present invention, the working process thereof is explained in detail as follows.

The present invention discloses a system for preparing nanoparticles by supercritical hydrothermal synthesis, wherein: a first reactant and a second reactant are respectively pressurized through a first material pump 11 and a second material pump 16 and then pumped into the premixer 12 for mixing. High-temperature water at the outlet of the premixer 12 is mixed with high-temperature water at the outlet of the heating furnace 10 in the mixer 13, the outlet of the mixer 13 is communicated with the inlet of the supercritical hydrothermal synthesis reactor 14; the outlet of the supercritical hydrothermal synthesis reactor 14 is communicated with the pipe side inlet of the heat regenerator 9, the pipe side outlet of the heat regenerator 9 is divided into two portions, one portion is communicated with the inlet of the heat exchange coil in the first reactant modulation pool 1, the other portion is merged with the outlet of the heat exchange coil and then communicated with the inlet of the steam generator 2 in the waste heat power generation system 20, a flow distribution between the two portions is achieved by the regulating valve on the pipeline for controlling a temperature of the first reactant modulation pool 1, the fluid at the low-temperature section outlet of the heating furnace 10 enters the casing side inlet of the heat regenerator 9, the fluid at the casing side outlet of the heat regenerator 9 enters the high-temperature section inlet of the heating furnace; the outlet of the steam generator 2 is communicated with the back pressure valve 4 through the pipeline filter 3, the outlet of the back pressure valve 4 is communicated with the gas-liquid separator 5, a liquid-phase product outlet is communicated with the inlet of the centrifugal separator 6 after depressurizing through the back pressure valve 4; the liquid-phase product outlet of the centrifugal separator 6 is communicated with the oil-phase inlet of the oil-water separator 7; the oil-phase outlet of the oil-water separator 7 is communicated with the second reactant storage pool 19, the water-phase outlet of the oil-water separator 7 is communicated with the oil-phase fine filtration unit 8, an oil water mixture filtered by the fine filtration unit 8 converges with an inlet pipeline of the oil-water separator 7 for further removing moisture in a mixture of organic ligands and water, so as to highly-effective recycle and reuse the organic ligands.

It should be supplemented that pure water firstly enters the low-temperature section inlet of the heating furnace 10, the low-temperature section outlet of the heating furnace 10 is communicated with the casing side inlet of the heat regenerator 9, the casing side outlet of the heat regenerator 9 is communicated with the high-temperature section inlet of the heating furnace 10, the reacted desalination fluid enters the pipe side inlet of the heat generator 9 and proceeds heat exchange with cold fluid at the low-temperature section of the heating furnace 10; the pipe side outlet of the heat regenerator 9 is communicated with the heat exchange coil in the first reactant modulation pool 1, so that an outlet smoke temperature of the heating furnace 10 is reduced, as well as the system heat recovery is sufficiently utilized; the heat exchange coil in the first reactant modulation pool 1 is able to utilize low-temperature residual heat of the reaction product to preheat the first reactant for improving a solubility of the first reactant.

Furthermore, the centrifugal separator 6 separates and recycles nano-particles products, the fluid at the outlet of the centrifugal separator 6 is connected with the oil-water separator 7 to separate most of the organic ligands, and then the organic ligands are further recycled through the fine filtration unit 8. The system of the present invention is able to achieve highly-effective recycling and reusing the organic ligands.

In the above embodiments, the first reactant is a generally metal salt solution, which is able to be embodied as a preprocessing process which extracts metal salt from waste liquid containing metals; the second reactant is a mixture of alkali liquor, reducing agent and organic ligand, which is able to be embodied as a single component or a mixture of two components in above mentioned components as required.

What is claimed is:

1. A system for preparing nanoparticles by supercritical hydrothermal synthesis, comprising a first reactant modulation pool (1), a steam generator (2), a back pressure valve (4), a gas-liquid separator (5), a centrifugal separator (6), an oil-water separator (7), a heat regenerator (9), a heating furnace (10), a first material pump (11), a premixer (12), a mixer (13), a supercritical hydrothermal synthesis reactor (14), a second material pump (16), a pure water pump (17), a pure water storage tank (18), a second reactant storage pool (19), and a waste heat power generation system (20), wherein:

an outlet of the first reactant modulation pool (1) is communicated with an inlet of the first material pump (11), an outlet of the first material pump (11) is communicated with a first inlet of the premixer (12);

an outlet of the second reactant storage pool (19) is communicated with an inlet of the second material pump (16), an outlet of the second material pump (16) is communicated with a second inlet of the premixer (12), and an outlet of the premixer (12) is communicated with a vertical inlet of the mixer (13);

an outlet of the pure water storage tank (18) is communicated with an inlet of the pure water pump (17), an outlet of the pure water pump (17) is communicated with a low-temperature section inlet of the heating furnace (10), a low-temperature section outlet of the heating furnace (10) is communicated with a casing side inlet of the heat regenerator (9), a casing side outlet of the heat regenerator (9) is communicated with a high-temperature section inlet of the heating furnace (10), a high-temperature section outlet of the heating furnace (10) is communicated with a high-temperature water inlet of the mixer (13), a vertical outlet of the mixer (13) is communicated with an inlet of the supercritical hydrothermal synthesis reactor (14), an outlet of the supercritical hydrothermal synthesis reactor (14) is communicated with a pipe side inlet of the heat regenerator (9), a pipe side outlet of the heat regenerator (9) is divided into two portions, one portion is communicated with an inlet of a heat exchange coil in the first reactant modulation pool (1), the other portion is merged with an outlet of the heat exchange coil and then communicated with an inlet of the steam generator (2) in the waste heat power generation system (20), an outlet of the steam generator (2) is communicated with an inlet of the back pressure valve (4), an outlet of the back pressure valve (4) is communicated with an inlet of the centrifugal separator (6), an outlet of the centrifugal separator (6) is communicated with an oil-phase inlet of the oil-water separator (7), an oil-phase outlet of the oil-water separator (7) is communicated with an inlet of the second reactant storage pool (19).

2. The system for preparing nanoparticles by supercritical hydrothermal synthesis, as recited in claim 1, further comprising a desalination device (15) which is located at a pipeline where the outlet of the supercritical hydrothermal synthesis reactor (14) is communicated with the pipe side inlet of the heat regenerator (9), the outlet of the supercritical hydrothermal synthesis reactor (14) is communicated with an inlet of the desalination device (15), and an outlet of the desalination device (15) is communicated with the pipe side inlet of the heat regenerator (9).

3. The system for preparing nanoparticles by supercritical hydrothermal synthesis, as recited in claim 1, further comprising a desalination device (15) which is located at a pipeline where the outlet of the centrifugal separator (6) is communicated with the oil-phase inlet of the oil-water separator (7), the outlet of the centrifugal separator (6) is communicated with an inlet of the desalination device (15), and an outlet of the desalination device (15) is communicated with the oil-phase inlet of the oil-water separator (7).

4. The system for preparing nanoparticles by supercritical hydrothermal synthesis, as recited in claim 1, further comprising a pipeline filter (3) which is located at a pipeline where the outlet of the steam generator (2) is communicated with the inlet of the back pressure valve (4), the outlet of the steam generator (2) is communicated with an inlet of the pipeline filter (3), and an outlet of the pipeline filter (3) is communicated with the inlet of the back pressure valve (4).

5. The system for preparing nanoparticles by supercritical hydrothermal synthesis, as recited in claim 2, further comprising a pipeline filter (3) which is located at a pipeline where the outlet of the steam generator (2) is communicated with the inlet of the back pressure valve (4), the outlet of the steam generator (2) is communicated with an inlet of the pipeline filter (3), and an outlet of the pipeline filter (3) is communicated with the inlet of the back pressure valve (4).

6. The system for preparing nanoparticles by supercritical hydrothermal synthesis, as recited in claim 3, further comprising a pipeline filter (3) which is located at a pipeline where the outlet of the steam generator (2) is communicated with the inlet of the back pressure valve (4), the outlet of the steam generator (2) is communicated with an inlet of the pipeline filter (3), and an outlet of the pipeline filter (3) is communicated with the inlet of the back pressure valve (4).

7. The system for preparing nanoparticles by supercritical hydrothermal synthesis, as recited in claim 1, further comprising a fine filtration unit (8) which is located at a pipeline where a water-phase outlet of the oil-water separator (7) is communicated with the oil-phase inlet of the oil-water separator (7), the water-phase outlet of the oil-water separator (7) is communicated with an inlet of the fine filtration unit (8), and an outlet of the fine filtration unit (8) is communicated with the oil-phase inlet of the oil-water separator (7).

8. The system for preparing nanoparticles by supercritical hydrothermal synthesis, as recited in claim 2, further comprising a fine filtration unit (8) which is located at a pipeline where a water-phase outlet of the oil-water separator (7) is communicated with the oil-phase inlet of the oil-water separator (7), the water-phase outlet of the oil-water separator (7) is communicated with an inlet of the fine filtration unit (8), and an outlet of the fine filtration unit (8) is communicated with the oil-phase inlet of the oil-water separator (7).

9. The system for preparing nanoparticles by supercritical hydrothermal synthesis, as recited in claim 6, further comprising a fine filtration unit (8) which is located at a pipeline where a water-phase outlet of the oil-water separator (7) is communicated with the oil-phase inlet of the oil-water separator (7), the water-phase outlet of the oil-water separator (7) is communicated with an inlet of the fine filtration unit (8), and an outlet of the fine filtration unit (8) is communicated with the oil-phase inlet of the oil-water separator (7).

10. The system for preparing nanoparticles by supercritical hydrothermal synthesis, as recited in claim 1, wherein: a regulating valve is located at a pipeline of the pipe side outlet of the heat regenerator (9).

11. The system for preparing nanoparticles by supercritical hydrothermal synthesis, as recited in claim 2, wherein: a regulating valve is located at a pipeline of the pipe side outlet of the heat regenerator (9).

12. The system for preparing nanoparticles by supercritical hydrothermal synthesis, as recited in claim 9, wherein: a regulating valve is located at a pipeline of the pipe side outlet of the heat regenerator (9).

13. The system for preparing nanoparticles by supercritical hydrothermal synthesis, as recited in claim 1, wherein: the high-temperature water inlet of the mixer (13) comprises three side entrances which are evenly distributed at a periphery of a vertical entry section of the mixer (13).

14. The system for preparing nanoparticles by supercritical hydrothermal synthesis, as recited in claim 2, wherein: the high-temperature water inlet of the mixer (13) comprises three side entrances which are evenly distributed at a periphery of a vertical entry section of the mixer (13).

15. The system for preparing nanoparticles by supercritical hydrothermal synthesis, as recited in claim 12, wherein: the high-temperature water inlet of the mixer (13) comprises three side entrances which are evenly distributed at a periphery of a vertical entry section of the mixer (13).

16. The system for preparing nanoparticles by supercritical hydrothermal synthesis, as recited in claim 1, further comprising a first reactant pretreatment system (21), wherein: an outlet of the first reactant pretreatment system (21) is communicated with the inlet of the first reactant modulation pool (1).

17. The system for preparing nanoparticles by supercritical hydrothermal synthesis, as recited in claim 2, further comprising a first reactant pretreatment system (21), wherein: an outlet of the first reactant pretreatment system (21) is communicated with the inlet of the first reactant modulation pool (1).

18. The system for preparing nanoparticles by supercritical hydrothermal synthesis, as recited in claim 15, further comprising a first reactant pretreatment system (21), wherein: an outlet of the first reactant pretreatment system (21) is communicated with the inlet of the first reactant modulation pool (1).

19. The system for preparing nanoparticles by supercritical hydrothermal synthesis, as recited in claim 1, wherein: the first reactant modulation pool (1) is configured to accommodate a first reactant, the second reactant storage pool (19) is configured to accommodate a second reactant, the first reactant is a metal salt solution, and the second reactant is selected from a group consisting of alkali liquor, reducing agent and organic ligand.

20. The system for preparing nanoparticles by supercritical hydrothermal synthesis, as recited in claim 18, wherein: the first reactant modulation pool (1) is configured to accommodate a first reactant, the second reactant storage pool (19) is configured to accommodate a second reactant, the first reactant is a metal salt solution, and the second reactant is selected from a group consisting of alkali liquor, reducing agent and organic ligand.

\* \* \* \* \*